(12) United States Patent
Yano et al.

(10) Patent No.: US 7,885,433 B2
(45) Date of Patent: Feb. 8, 2011

(54) BIOMETRICS AUTHENTICATION METHOD AND BIOMETRICS AUTHENTICATION SYSTEM

(75) Inventors: Masayuki Yano, Inagi (JP); Yasuhiko Mita, Inagi (JP); Naoko Suzuki, Inagi (JP); Shinya Iwasaki, Inagi (JP); Kazuo Takaku, Inagi (JP); Ikuo Mutou, Takasaki (JP); Yutaka Katsumata, Inagi (JP)

(73) Assignees: Fujitsu Limited, Kawasaki (JP); Fujitsu Frontech Limited, Inagi-shi (JP)

( * ) Notice: Subject to any disclaimer, the term of this patent is extended or adjusted under 35 U.S.C. 154(b) by 1044 days.

(21) Appl. No.: 11/699,983

(22) Filed: Jan. 31, 2007

(65) Prior Publication Data

US 2008/0002861 A1    Jan. 3, 2008

(30) Foreign Application Priority Data

Jun. 29, 2006   (JP)   ............................. 2006-180073

(51) Int. Cl.
*G06K 9/00*   (2006.01)
(52) U.S. Cl. ...................................... 382/115; 382/124
(58) Field of Classification Search ......... 382/115–118, 382/124, 209, 218; 340/5.1, 5.2, 5.21, 5.52, 340/5.53, 5.82, 5.83; 713/186; 902/3
See application file for complete search history.

(56) References Cited

U.S. PATENT DOCUMENTS

| | | | | |
|---|---|---|---|---|
| 6,993,160 | B2* | 1/2006 | Miura et al. ................. | 382/115 |
| 7,382,904 | B2* | 6/2008 | Lee ............................. | 382/124 |
| 2003/0039380 | A1 | 2/2003 | Sukegawa et al. | |
| 2003/0128099 | A1* | 7/2003 | Cockerham .................. | 340/5.7 |
| 2005/0111709 | A1 | 5/2005 | Topping | |
| 2006/0222211 | A1* | 10/2006 | Olivo et al. .................. | 382/115 |
| 2007/0085655 | A1* | 4/2007 | Wildman et al. ........... | 340/5.53 |

FOREIGN PATENT DOCUMENTS

| | | |
|---|---|---|
| EP | 1387309 A2 | 2/2004 |
| EP | 1669942 A1 | 6/2006 |
| JP | 2001-297177 A | 10/2001 |
| JP | 2002-117178 A | 4/2002 |
| JP | 2002-207947 A | 7/2002 |
| JP | 2003-141542 A | 5/2003 |
| JP | 2005-182184 A | 7/2005 |
| JP | 2005-215963 A | 8/2005 |

OTHER PUBLICATIONS

European Search Report dated Sep. 23, 2008, issued in corresponding European Patent Application No. 07101680.2.

* cited by examiner

*Primary Examiner*—Daniel G Mariam
(74) *Attorney, Agent, or Firm*—Westerman, Hattori, Daniels & Adrian, LLP

(57) ABSTRACT

A biometrics authentication system detect body characteristics, verify the characteristics against registered biometrics data to perform individual authentication. In 1:n authentication, a plurality of different type biometrics database sets of a user are registered in a database, and at the time of verification of one type biometrics data set with one type registered biometrics data set, the control unit judges whether similar biometrics data sets of other person are registered, and if other person's similar biometrics data sets are registered, performs verification of each of the another type biometrics data sets of the plurality of similar biometrics data sets with the detected another type biometrics data set, and identifies the individual in question.

22 Claims, 11 Drawing Sheets

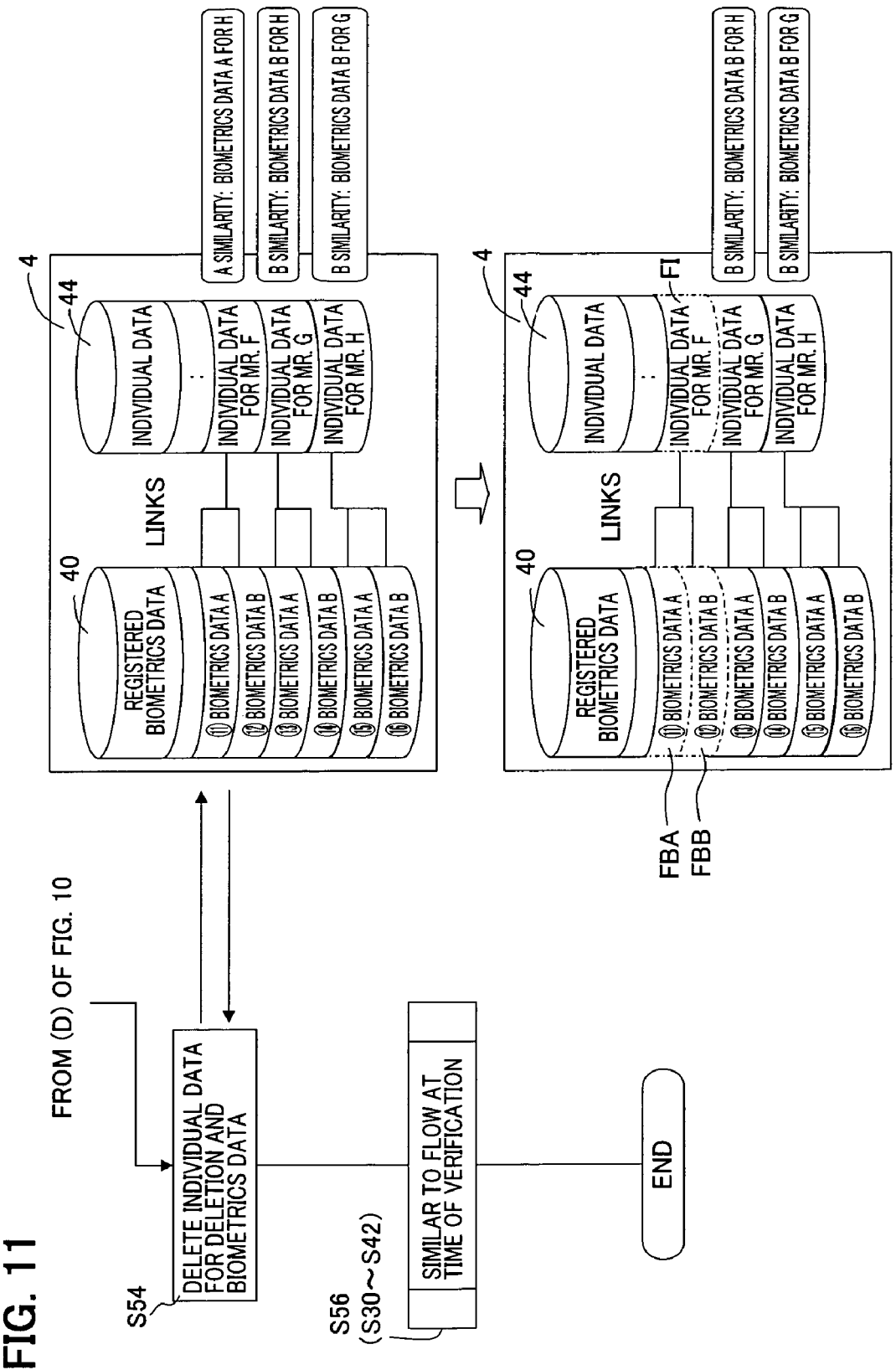

BIOMETRICS AUTHENTICATION METHOD AND BIOMETRICS AUTHENTICATION SYSTEM

CROSS-REFERENCE TO RELATED APPLICATIONS

This application is based upon and claims the benefit of priority from the prior Japanese Patent Application No. 2006-180073, filed on Jun. 29, 2006, the entire contents of which are incorporated herein by reference.

BACKGROUND OF THE INVENTION

1. Field of the Invention

This invention relates to a biometrics authentication method and system for individual authentication, utilizing biometric characteristics which are a portion of the human body, and in particular relates to a biometrics authentication method and system which verifies a plurality of registered biometric data sets against a detected biometric data set, and which is suitable for use in individual authentication.

2. Description of the Related Art

Among individual authentication techniques of recent years, biometrics authentication technology has attracted attention. There are numerous portions of the human body which can be used to differentiate the individual, such as fingerprints and toeprints, the retinas of the eyes, facial features, and blood vessels, so in such a biometrics authentication technology, biometrics characteristics of such portions of the human body are identified to perform individual authentication.

For example, comparatively large amounts of individual characteristic data are obtained from blood vessels in the fingers and palms of the hands, and from palmprints. Moreover, blood vessel (vein) patterns remain unchanged throughout life from infancy and are regarded as being completely unique, and so are well-suited to individual authentication.

In such biometrics authentication, first a portion of the biometric characteristics of the user himself is detected by a detection apparatus, and the detected biometric data is registered in the database of a server. Next, in order to perform individual authentication, a portion of the biometric characteristics of the user is detected by a detection apparatus, and the detected biometrics data is verified against the biometric data registered in the database, and individual authentication is performed based on degree of similarity.

In this method, in which biometric data for numerous users is registered in the database in advance, and biometrics data detected for a user is verified against the numerous biometric data sets in the database (called 1:n authentication), biometric data is registered without comparing biometric data to be registered with previously registered biometric data. On the other hand, within the biometric data there may be biometric data for other persons which is similar to ones own biometric data. In verifying biometric data, when the verification result exceeds a degree of similarity threshold, the person is authenticated as the individual in question; hence when verifying data against the similar biometric data of another person, there may be cases in which this other person is authenticated as the individual, and so identification of the individual becomes difficult.

In order to prevent confusion with other persons in such 1:n authentication, in biometrics authentication using facial images, a method has been proposed in which the other persons of biometric data with a high degree of similarity with the biometric data of the individual in question are registered in advance in an erroneous recognition persons list, and at the time of verification, upon identification as a person registered on this list, the threshold for verification is raised, and verification is again performed (see for example Japanese Patent Laid-open No. 2005-182184).

Further, in biometrics authentication using facial images, a method has been proposed in which a similarity is calculated at the time of registration, if there is a similar pattern, biometrics data is registered together with a similarity group number, and at the time of verification, when there is a similarity pattern number, the verification threshold is raised, and verification is performed (see for example Japanese Patent Laid-open No. 2003-141542).

SUMMARY OF THE INVENTION

Because the state of the body at the time of detection is not constant, detected biometric data is not normally the same. Hence in order to perform verification, complete matching of the registered biometric data with the detected biometric data is not used as a condition; instead, pattern recognition technology is used to calculate the degree of similarity of both biometric data sets, and when the degree of similarity is equal to or above a prescribed threshold, the verification result is judged to be satisfactory, and the individual is recognized.

However, in the technology of the prior art, when the similarity with the biometric data for another person is high, the threshold for the degree of similarity is raised, and so when data detected for the body of the individual in question is verified against registered data for the individual in question, if the threshold is raised, there is the possibility that the verification result will be judged not satisfactory, despite the fact that the person is the individual in question. For example, because the state of the body (for example, an image of blood vessels) changes with the temperature at the time of use and the state of the individual in question, if the person cannot be reliably authenticated as the individual in question from the biometrics data even in such cases, inconvenience may result for the individual in question.

On the other hand, if the threshold of the degree of similarity is set low in advance, verification precision deteriorates, and reliability is lowered. Further, judgments that results of verification with the biometric data for other persons are satisfactory will become more frequent, judgments of the presence or absence of similarity patterns will increase, and so verification speeds will be reduced. That is, the user will sense a wait time, and the ratio of use will be lowered.

Hence this problem impedes the spread of biometrics authentication apparatuses for individual use, and moreover is a cause of inconvenience to the user; and so even in such an environment, further measures are required enabling effective use of biometrics authentication.

Hence an object of this invention is to provide a biometrics authentication method and a biometrics authentication system to prevent the erroneous recognition of other persons 1:n authentication, and to improve the accuracy of authentication of the individual in question.

A further object of this invention is to provide a biometrics authentication method and a biometrics authentication system to improve the precision of biometrics authentication of the individual in question in 1:n authentication, and to prevent authentication failures of data of the individual in question.

Still a further object of this invention is to provide a biometrics authentication method and a biometrics authentication system to improve the precision of authentication of the individual in question in 1:n authentication, without lengthening the authentication time.

In order to attain these objects, a biometrics authentication system of this invention has a detection device which detects the relevant portion of the body and outputs biometric data indicating the characteristics of the body; a database file which stores at least two different type biometric data sets for a plurality of users, detected by the detection device; and a control unit which verifies the biometric data detected at the time of authentication against biometric data registered in the database file, and identifies an individual with biometric characteristic data for which the verification result is satisfactory; at the time of authentication, the control unit verifies one type biometric data set detected by the detection device against one type biometrics data set registered in the database file, and upon judging that one similar registered biometrics data set exists, verifies another type biometric data set detected by the detection device against another type biometric data set registered in the database file, and performs individual authentication.

Further, a biometrics authentication method of this invention has a step of detecting the relevant portion of the body using a detection device, and of outputting biometric data indicating the characteristics of the body; a step of registering, in a database file, at least two different type biometric data sets for a plurality of users, detected by the detection device; a step of verifying detected one type biometric data set against one type biometric data set registered in the database file, and judging whether there exists the registered one type biometric data set which is similar; and a step of, when the one type similar biometric data set is judged to be registered, verifying another type biometric data set detected by the detection device against another type biometric data set registered in the database file to perform individual authentication.

Further, in this invention, it is preferable that at the time of registration of the biometric data, the control unit perform verification of at least one type biometric data set detected by the detection device and the one type biometric data set registered in the database file, judge whether a similar biometric data set is registered, and, when similar one type biometric data set is registered, register similarity information indicating the existence of similar data in the database file together with the two different type biometric data sets, and at the time of authentication, if it is judged that there exists registered one type biometric data set similar to the detected one type biometric data set, verify detected another type biometric data against another type biometric data registered in the database file by referencing the similarity information, and perform individual authentication.

Further, in this invention, it is preferable that upon judging that there exists one type registered biometric data set similar to one type detected biometric data set, the control unit identify, from similar information which has been set for the one type biometric data set judged to be similar, another type biometric data set forming a pair with the other similar one type biometric data set, verify another type detected biometrics set against the identified another type biometric set and another type biometric data set forming a pair with the one similar one type biometric data set registered in the database file, and perform individual authentication.

Further, in this invention, it is preferable that the control unit set, as the similarly information, an identifier of the other similar biometrics data set in the one similar biometrics data set, and an identifier of the one similar biometrics data set in the other similar biometrics data set.

Further, in this invention, it is preferable that upon judging that one type registered biometric data set similar to the one detected one type biometric data set exists, the control unit identify, from among the identifiers of similar other biometric data sets which have been set in the one similar biometrics data set so judged, another type biometric data set forming a pair with the other similar one type biometric data set, verify another type detected biometrics set against the identified another type biometric set and another type biometric data set forming a pair with the one similar one type biometric data set registered in the database file, and perform individual authentication.

Further, in this invention, it is preferable that the database file have a biometrics database file which stores biometric data, an individual database file which stores individual data for the user, and a link table which links the individual data in the individual database file to the biometric data in the biometrics data file.

Further, in this invention, it is preferable that in the individual data of the individual data file there be stored similarity information indicating the fact that there is registered biometrics data for another person similar to the biometrics data for the user of the individual data.

Further, in this invention, it is preferable that, after deleting biometric data for the user from the database file, the control unit acquire biometric data for the user from the detection device, and verify the data against the biometric data registered in the database file, to confirm the deletion.

Further, in this invention, it is preferable that the control unit set, as similarity information, an identifier of other similar biometric data set in the one similar biometric data set, and an identifier of the one similar biometric data set in the other similar biometric data set, and in addition delete the biometrics data for the user and the both identifiers from the database file.

Further, in this invention, it is preferable that the detection device be a device which detects a blood vessel image of the body.

Further, in this invention, it is preferable that the detection device be an image capture unit which captures a blood vessel image of a hand of the body.

In this invention, even when one type biometric data set and one type registered biometrics data set reach a threshold for degree of similarity in 1:n authentication, a judgment is made as to whether similar biometric set of another person is registered, and if similar biometric data sets of another person are registered, each of the plurality of another type biometric data sets corresponding to the similar one type biometric data set are verified against another type detected biometric data set, and the individual in question is identified. When one type biometric data set of another person is similar to one type biometric data set of the individual in question, another type biometric data set for the individual in question is verified against another type biometrics data for the other person, so that accurate authentication of the individual in question is possible without modifying the threshold of the degree of similarity, and in addition cases in which the individual in question cannot himself be authenticated as the individual in question can be prevented.

BRIEF DESCRIPTION OF THE DRAWINGS

FIG. 11 is a second flow diagram of biometrics data deletion processing in one embodiment of the invention.

DESCRIPTION OF THE PREFERRED EMBODIMENTS

Below, embodiments of the invention are explained, in the order of a biometrics authentication system, a biometrics authentication mechanism, biometric data registration processing, biometrics data authentication processing, biometric data deletion processing, and other embodiments.

Biometrics Authentication System

Figure 1:
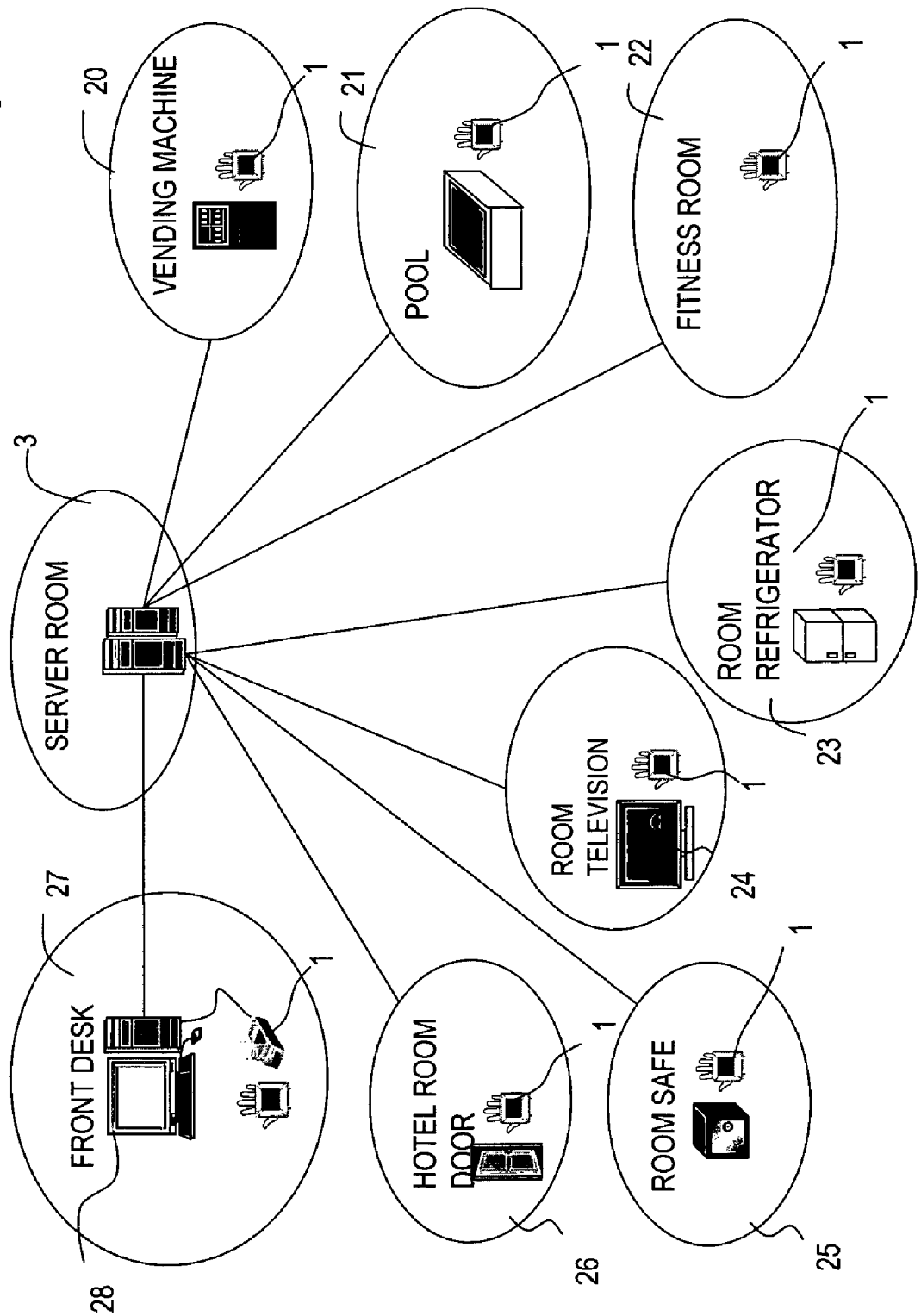
FIG. 1 shows the configuration of the biometrics authentication system of one embodiment of the invention.
Figure 2:
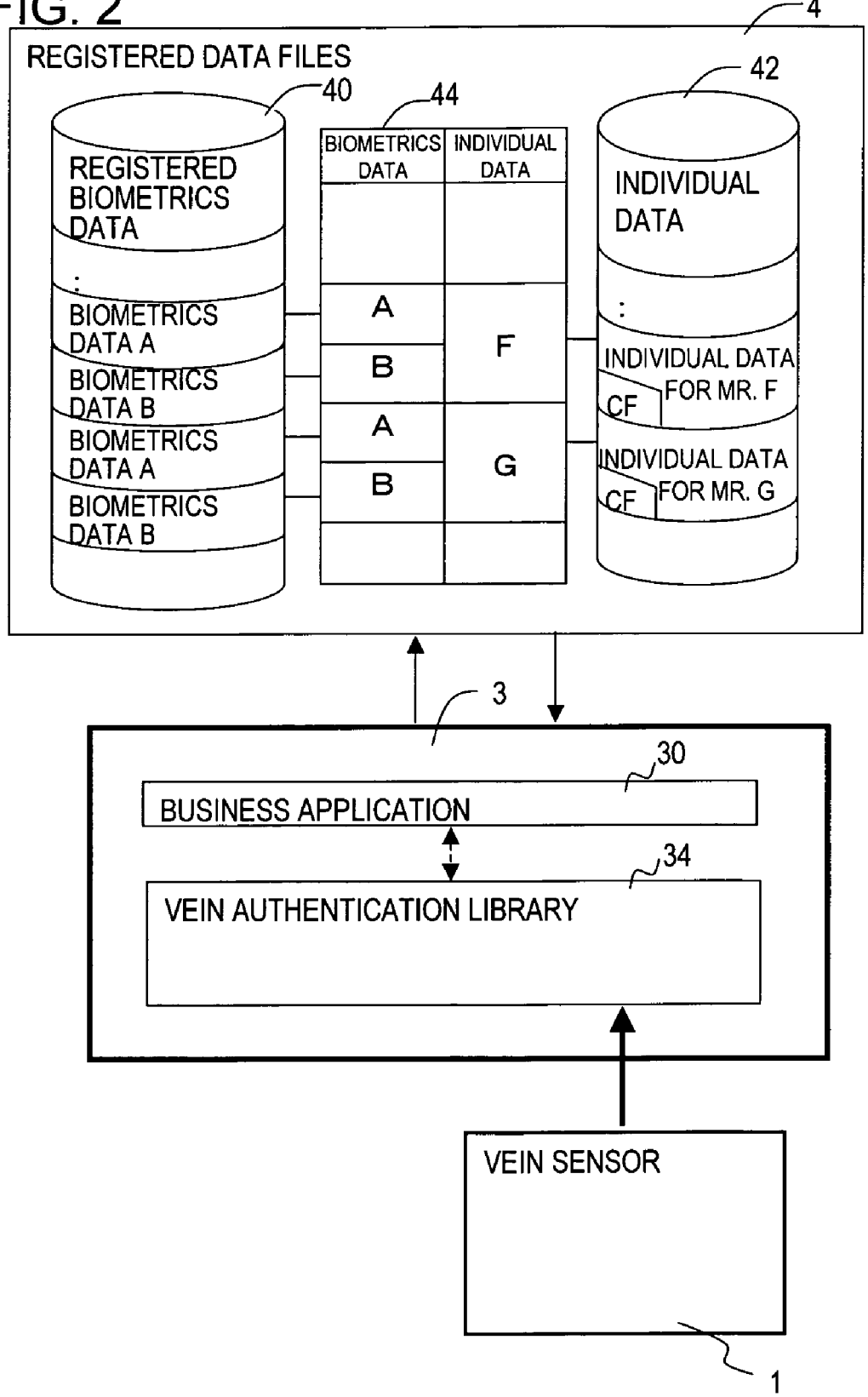
FIG. 2 is a block diagram of the biometrics authentication system of FIG. 1.
Figure 3:
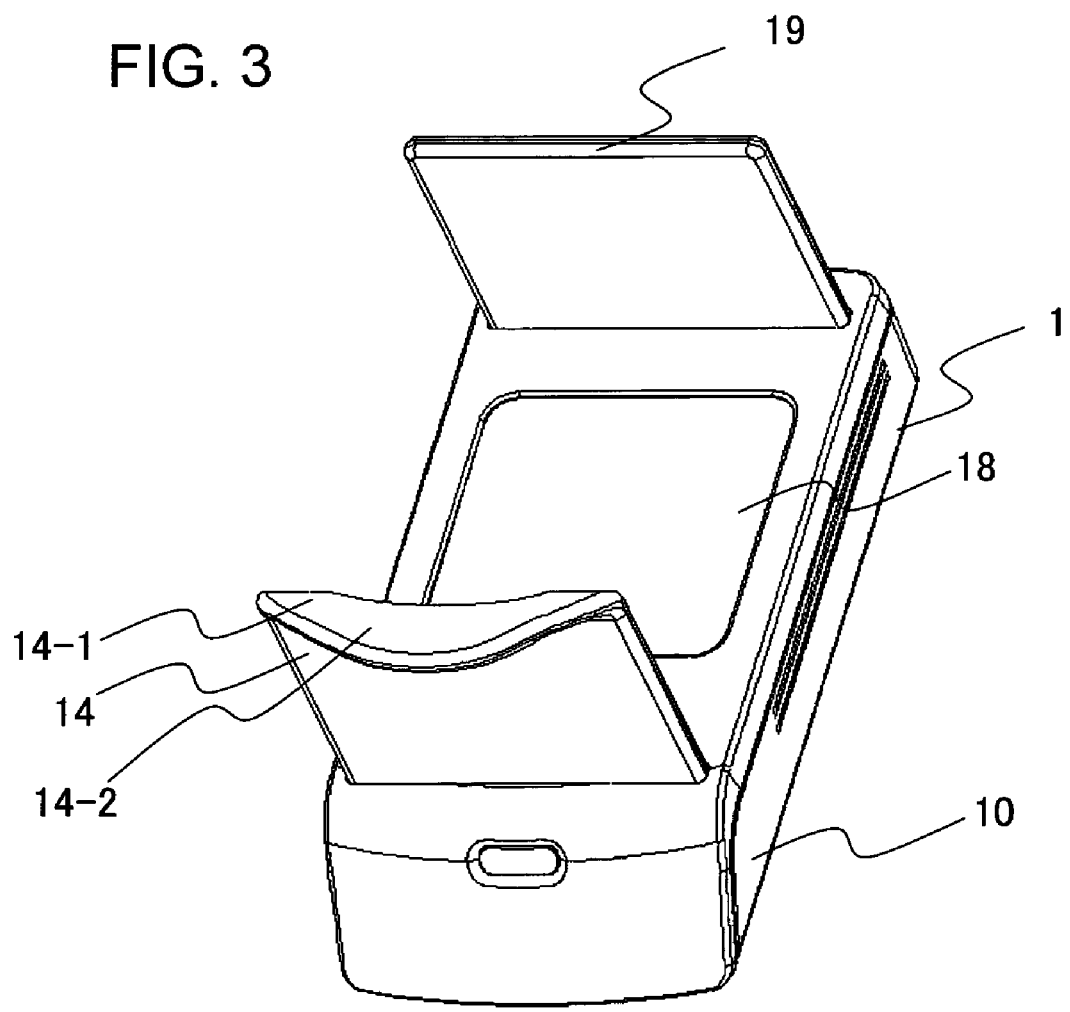
FIG. 3 is an external view of the blood vessel image detection device of FIG. 1.
Figure 4:
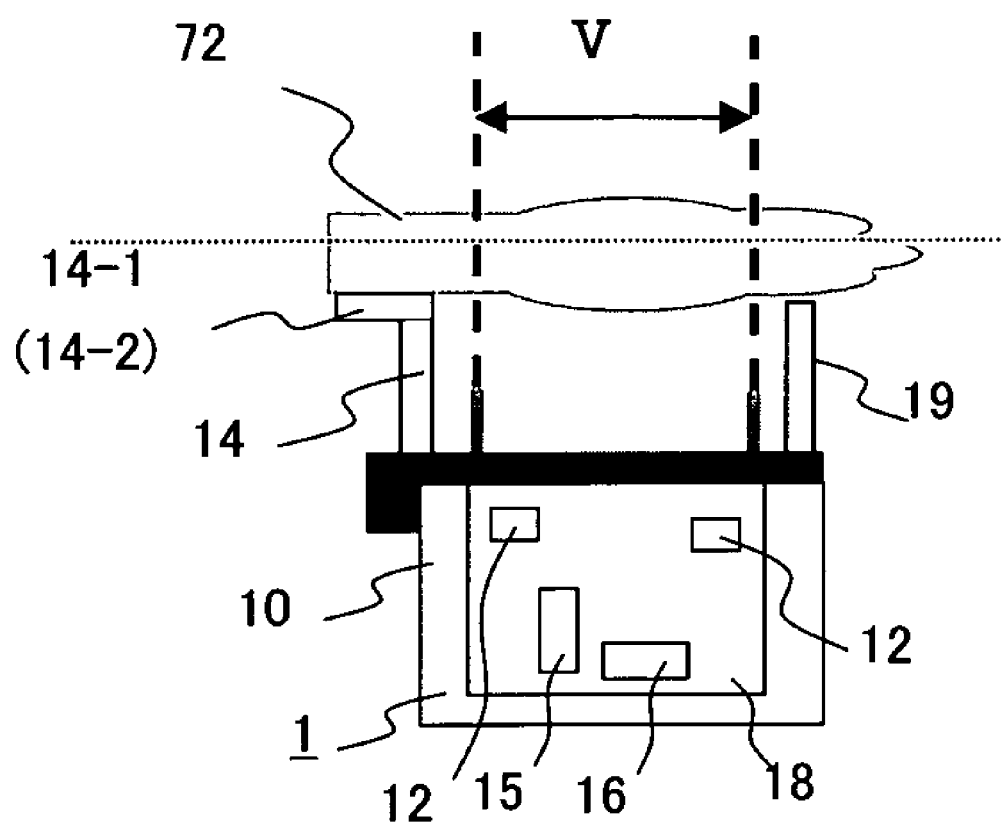
FIG. 4 shows the configuration of the detection device of FIG. 3.

FIG. 1 shows the configuration of the biometrics authentication system of one embodiment of the invention, FIG. 2 shows the detailed configuration of the system of FIG. 1, FIG. 3 is an oblique view of the blood vessel image detection device in FIG. 1 and FIG. 2, and FIG. 4 shows the configuration of the blood vessel image detection device of FIG. 3.

FIG. 1 shows an example of the system used by a hotel or other facilities employing, as a biometrics authentication system, equipment for authorization using the veins in the palm of the hand. As shown in FIG. 1, within the hotel are provided a vending machine 20, pool 21, fitness room 22, front desk 27, and rooms. Within the rooms are provided a refrigerator 23, television 24, safe 25, and door 26.

At the front desk 27 of the hotel are provided a palm image capture device 1, explained in FIG. 2 below, and a business terminal (for example, a personal computer) 28 connected thereto. On the other hand, palm image capture devices 1 are also provided at the vending machine 20, pool 21, fitness room 22, and at the refrigerators 23, televisions 24, safes 25, and doors 26 of the rooms. The palm image capture devices 1 of the business terminal 28 at the front desk 27, of the vending machine 20, pool 21, fitness room 22, and of the refrigerators 23, televisions 24, safes 25, and doors 26 in the rooms, are connected to a server 3.

In this hotel system, upon entering the hotel a user places his palm over the palm image capture device 1 (hereafter called the image capture device) at the front desk 27, causing a blood vessel image to be read, and the business terminal 28 registers blood vessel image data (biometrics data) on the server 3. At the same time, individual data (name, address, sex, and similar) of the user is input from the business terminal 28 and is registered as individual data on the server 3.

Subsequently, the user places his palm over the image capture device 1 of the door 26 of a room, causing a blood vessel image to be read by the image capture device 1. The image capture device 1 sends the blood vessel image data to the server 3 for verification. If the verification result is satisfactory, the door 26 is opened under control by the server 3, and the user can enter the room. Similarly, upon placing the palm of the hand over the image capture device 1 for the safe 25 in the room, the image capture device 1 reads a blood vessel image. The image capture device 1 sends the blood vessel image data to the server 3 for verification. If the verification result is satisfactory, the door to the safe 25 is opened under control by the server 3, and items for storage can be placed into or retrieved from the safe.

Similarly, upon placing the palm of the hand over the image capture device 1 of the vending machine 20, pool 21, fitness room 22, room refrigerator 23, or room television 24, the image capture device 1 reads a blood vessel image. The image capture device 1 sends the blood vessel image data to the server 3 for verification. If the verification result is satisfactory, under control by the server 3, operation of the vending machine 20 is permitted, use of the pool 21 is permitted, use of the fitness room 22 is permitted, and use of the refrigerator 23 or television 24 is permitted.

In this case, as a result of use of the vending machine 20, refrigerator 23 and television 24, charges are accrued to the individual data on the server 3. Similarly, when there is a fee for using the pool 21 or fitness room 22, charges are accrued to the individual data on the server 3.

Upon checkout, the user places the palm of his hand over the palm image capture device 1 (hereafter "image capture device") at the front desk 27, causing a blood vessel image to be read, and the blood vessel image data (biometrics data) is transmitted to the server 3 via the business terminal 28. The server 3 verifies the registered blood vessel image data against the transmitted blood vessel image data. If the verification is satisfactory, the server 3 transmits the individual data (charge information and similar) for the individual to the business terminal 28. When the user's account is settled at the front desk 27, the server 3 deletes the registered blood vessel image data and individual data for the user.

As shown in FIG. 2, the server 3 has a vein authentication library (authentication program) 34 and a business application program 30, and executes these programs. The server 3 is connected to a data file device 4. This data file device 4 has a biometrics database file 40 which stores registered biometrics data (in this case, palm blood vessel image data); an individual data file 42 which stores individual data; and a link table 44, which indicates associations between the individual data in the individual data file 42 and the biometrics data in the biometrics database file 40.

In this invention, two types of different biometrics data A and B are registered in the biometrics database file 40 for a single individual; the link table 44 stores the link relation between the individual data for this person and the two different type biometrics data sets. That is, in this invention, two different type biometrics data sets (here, blood vessel image data) are registered for user individuals.

Further, registered individual data of the individual data file 42 includes, in addition to the number of nights stayed, billing information including charges, name, and address, similarity check information CF and similar. At the time of registration of blood vessel image data, verification of similarity with the registered blood vessel image data of other persons is performed, and if there is similar data, check information is set in this similarity check information CF. Further, at the time of verification of blood vessel image data, when it is judged that there is similarity with the blood vessel image data for an individual set in this check information, an instruction is issued to execute a verification check with another blood vessel image data set.

A business application 30 which performs registration, updating, deletion, and similar of individual data including charges, and a vein authentication library (program) 34, are installed on the server 3. On the other hand, a vein authentication library (program) 34 is also installed on the terminal device 28. A vein sensor (palm image capture device) 1 is connected to the terminal 28.

As shown in FIG. 3, the palm image capture device 1 of FIG. 1 and FIG. 2 has a sensor unit 18 mounted substantially in the center of the main unit 10. On the forward portion (on the user side) of the sensor unit 18 is provided a front guide 14; on the rear side is provided a rear guide 19. The front guide 14 comprises a sheet of synthetic resin, transparent or substantially transparent. The front guide 14 serves the purposes of guiding the hand of the user in the front and of supporting the wrist.

Hence as shown in FIG. 4, the front guide 14 provides guidance to the user to guide and support the wrist above the sensor unit 18. As a result, the attitude of the palm of the hand, that is, the position, inclination, and size over the sensor unit 18 can be controlled. The cross-sectional shape of the front guide 14 has a vertical body and, in the top portion, a horizontal portion 14-1 to support the wrist. A depression 14-2 is formed continuously in the center of the horizontal portion 14-1, to facilitate positioning of the wrist. The rear guide 19 serves to support the fingers.

As shown in FIG. 4, the sensor unit 18 is provided with an infrared sensor (CMOS sensor) and focusing lens 16 and a distance sensor 15 in the center; on the periphery thereof are provided a plurality of near-infrared light emission elements (LEDs) 12. For example, near-infrared light emission elements are provided at eight places on the periphery, to emit near-infrared rays upwards.

The readable region V of this sensor unit 18 is regulated by the relation between the sensor, focusing lens, and near-infrared light emission region. Hence the position and height of the front guide 14 are set such that the supported palm is positioned in the readable region V. When the hand 72 is extended with palm flat, the palm has maximum area, and moreover is flat, so that when the palm is subjected to image capture in the image capture region V of the sensor unit 18, an accurate vein pattern which can be used in registration and verification is obtained. When the distance from the sensor unit 18 to the palm is within a prescribed range, a sharp, focused image is obtained by the sensor 16 of the sensor unit 18.

Hence as shown in FIG. 4, by having the front guide 14 support the wrist 72 above the sensor unit 18, the user's hand can be guided and supported such that the position, inclination and height of the palm above the sensor unit 18 are made precise with respect to the image capture range of the sensor unit 18.

Figure 5:
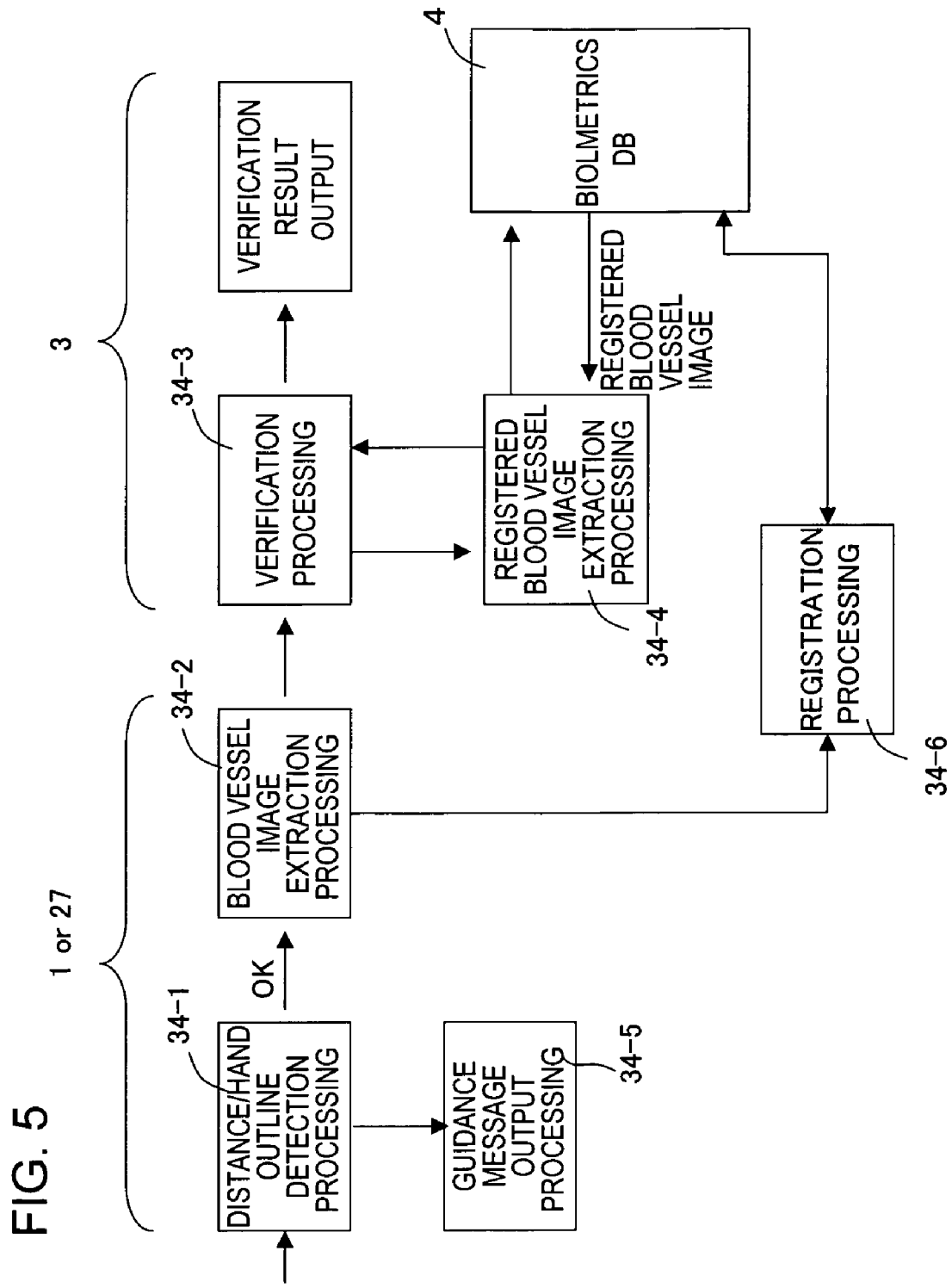
FIG. 5 is a block diagram of the biometrics authentication configuration in one embodiment of the invention.

Next, the vein authentication library 34 is explained using FIG. 5. As shown in FIG. 5, the vein authentication library 34 executes a series of registration and verification processing, 34-1 to 34-6. In this embodiment, the terminal device 28 or image capture device 1 executes the detection processing 34-1, extraction processing 34-2, and output processing 34-5, while the CPU of the server 3 executes the series of registration and verification processing 34-3, 34-4 and 34-6.

Distance/hand outline detection processing 34-1 receives the distance measured by the distance sensor 15 of the image capture device 1, judges whether the palm of the hand or other object is at a distance in a prescribed range from the sensor unit 18 and also detects the outline of the hand from the image captured by the sensor unit 18, and judges from the outline whether the image can be used in registration and verification processing. For example, the palm may not appear sufficiently in the image.

Guidance message output processing 34-5 outputs to the display of the terminal device 28 a message to guide the palm to the left or right, forward or backward, upward or downward, when the distance measured by the distance sensor 15 or the hand position determined from hand outline extraction indicates that the hand is outside the image capture range, or when the image cannot be used in registration and verification processing. By this means, the hand of the user is guided above the image capture device 1.

Blood vessel image extraction processing 34-2 extracts a vein image from the image of the hand when hand outline detection processing 34-1 judges that an image has been captured with the hand held correctly. That is, grayscale data of the image of the palm is obtained through differences in reflectivity; from this blood vessel image (grayscale) data, predetermined blood vessel image characteristics (the directions and numbers of trunks and branches of blood vessels, and similar) are extracted.

Registered blood vessel image search processing 34-4 retrieves registered blood vessel image data from the biometrics database file 40 shown in FIG. 2 and individual data from the individual data file 42. Verification processing 34-3 compares the blood vessel image data detected in blood vessel image detection processing 34-2 with the retrieved registered blood vessel image data, performs verification processing, and outputs the verification result.

Registration processing 34-6 extracts characteristic data of the blood vessel image from the detected blood vessel image data, stores the characteristic data in the biometrics database file 40, and creates a link table 44 with the individual data of the individual data file 42.

In the example of FIG. 2 and FIG. 5, the distance/hand outline detection processing 34-1, blood vessel image extraction processing 34-2, and guidance message output processing 34-5 are executed by the terminal device 28 and image capture device 1, while the server 3 executes the verification processing 34-3, registered blood vessel image extraction processing 34-4, and registration processing 34-6.

Biometrics Data Registration Processing

Figure 6:
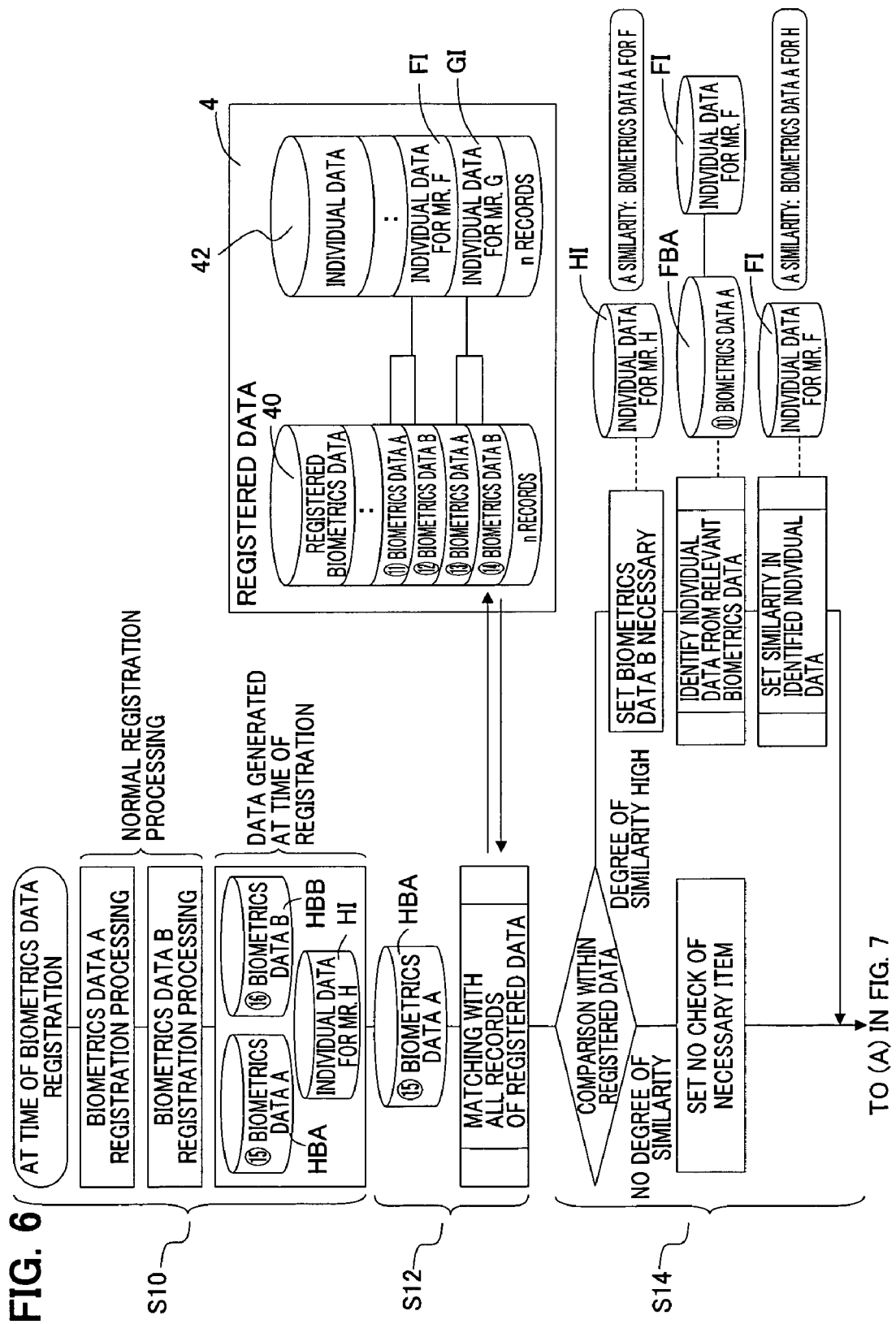
FIG. 6 is a first flow diagram of biometrics data registration processing in one embodiment of the invention.
Figure 7:
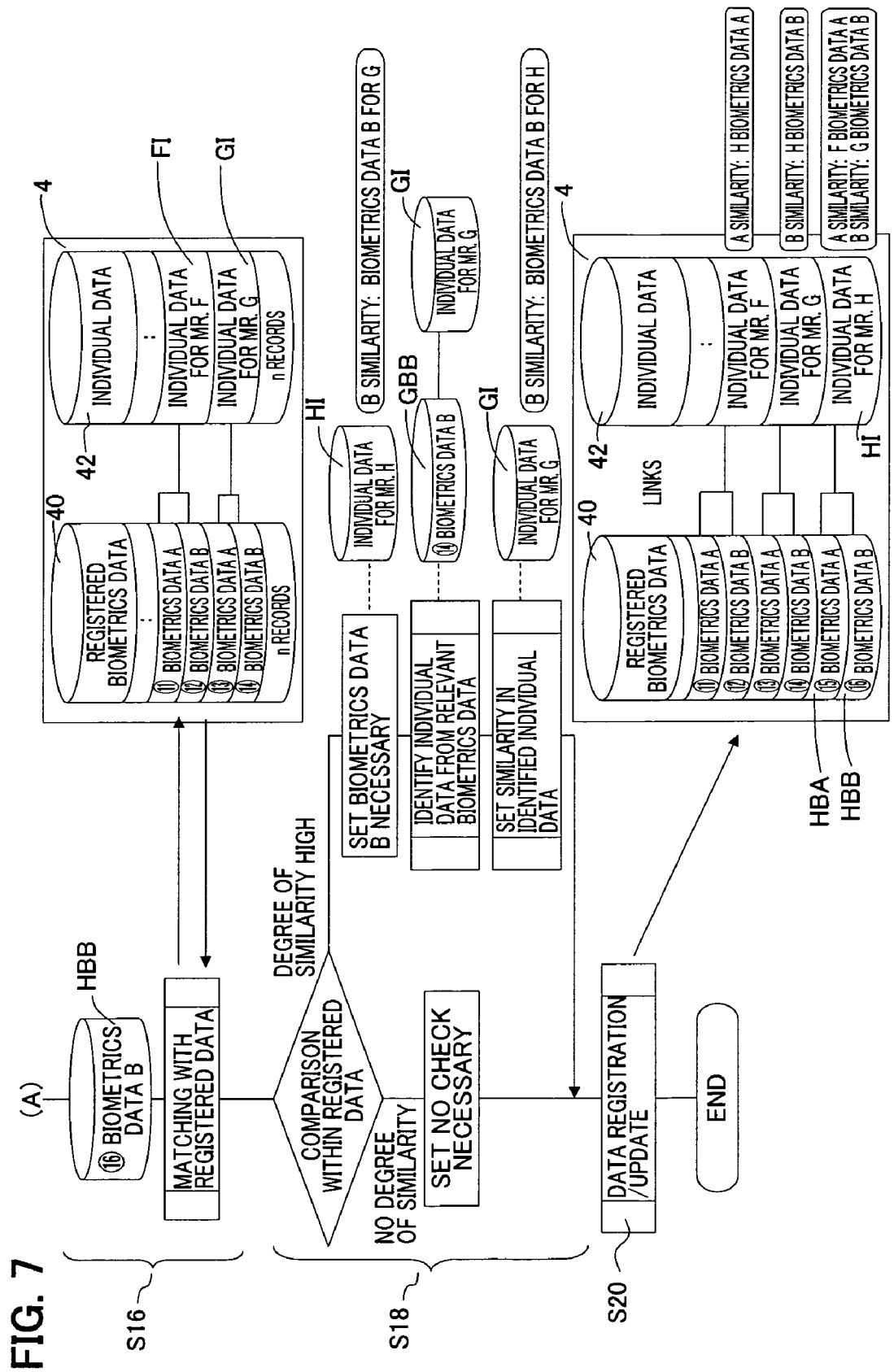
FIG. 7 is a second flow diagram of biometrics data registration processing in one embodiment of the invention.

Next, the biometrics data registration processing described using FIG. 1 and FIG. 2 is explained using FIG. 6 and FIG. 7. This registration processing is assumed to be performed by the terminal 28 and server 3 at the front desk 27 in FIG. 1 and FIG. 2, but can be performed by the server 3 alone. Here, the explanation is for an example in which the biometrics data is blood vessel image data for a palm of a hand, and two types of biometrics data are blood vessel image data for the right palm (biometrics data A), and blood vessel image data for the left palm (biometrics data B).

(S10) First, the user, upon checking in at the front desk 27, submits his individual data (name, address, sex, and similar). The user then places his right hand over the image capture device 1, and causes an image of the palm of his hand (blood vessel image) to be captured by the image capture device 1. The authentication library 34 of the terminal 28 shown in FIG. 2 and FIG. 5 executes the image capture processing 34-1, 34-2, 34-5 explained in FIG. 5, and acquires biometric characteristic data (characteristic data of the blood vessel image of the right hand) A. Next, the user holds his left hand over the image capture device 1, and causes an image of the left palm (blood vessel image) to be captured by the image capture device 1. The authentication library 34 of the terminal 28 in FIG. 2 and FIG. 5 executes the image capture processing 34-1, 34-2, 34-5 explained in FIG. 5, and acquires biometric characteristic data (characteristic data of the blood vessel image of the left hand) B. By this means, at the time of registration, first biometric data A (HBA) and second biometric data B (HBB), as well as individual data HI, are obtained for the user (here, "Mr. H"). The terminal device 28 transmits these three data sets to the server 3.

(S12) The server 3 verifies the biometric data A (HBA) for the right hand (of Mr. H) against all of the registered biometric data sets A for the right hand in the biometrics data file 40 of the data file device 4, and calculates degrees of similarity.

(S14) In obtaining this verification result, a judgment is made as to whether there exists a biometric data set A for another person with a degree of similarity equal to or above a threshold; if no such data set exists, processing proceeds to step S16 in FIG. 7. If however a similar biometrics data set A for another person is registered with a degree of similarity equal to or greater than the threshold, first, an identification number for the biometrics data A of the other person (here, Mr. F) judged to be similar is set in the similarity check information CF of the individual data HI for the user (Mr. H). Then, the link table 44 (see FIG. 2) is referenced, and individual data FI for the registered biometric data 'A' judged to be similar is identified. In addition, an identification number assigned to the biometric data set A (HBA) for the user (here, Mr. H) judged to be similar is set in the similarity check information CF for the identified individual data FI in the individual data file 42.

(S16) Next, similarity judgment is similarly performed for left-hand biometrics data. That is, the server 3 verifies left-hand biometrics data B (HBB) (for Mr. H) against all of the left-hand biometrics data B registered in the biometrics data file 40 of the data file device 4, and calculates degrees of similarity.

(S18) In obtaining this verification result, a judgment is made as to whether there exists a biometrics data set B for another person with a degree of similarity equal to or above a threshold; if no such data set exists, processing proceeds to step S20 in FIG. 7. If however a similar biometrics data set B for another person is registered with a degree of similarity equal to or greater than the threshold, first, an identification number for the biometrics data B of the other person (here, Mr. G) judged to be similar is set in the similarity check information CF of the individual data HI for the user (Mr. H). Then, the link table 44 (see FIG. 2) is referenced, and individual data GI for the registered biometrics data B judged to be similar is identified. In addition, an identification number assigned to the biometrics data set B (HBB) for the user (here, Mr. H) judged to be similar is set in the similarity check information CF for the identified individual data GI in the individual data file 42.

(S20) The server 3 registers the biometric data A (HBA) and biometric data B (HBB) for the user subjected to similarity judgments, and the individual data HI with similarity check information appended, in the biometrics database file 40 and in the individual database file 42 respectively, and sets the link relation between the individual data and the biometrics data sets A and B in the link table 44. Further, the server 3 updates the similarity check information for the individual data FI, GI in the individual data file 42.

In this way, two different type biometric data sets A and B, and individual data including similarity check information CF resulting from similarity judgment results, for the user (here, Mr. H) are registered in the biometrics database file 40 and in the individual database file 42 respectively, and moreover identification numbers for the biometric data sets A, B for the user are set in the individual data similarity check information of another individuals with biometrics data sets A, B similar to the biometrics data sets A, B for the individual.

Further, a link table 44 is provided, so that even when a portion of the individual data is known, the biometric data A, B cannot be directly acquired. This is useful for maintaining the security of the registered biometrics data.

Biometrics Data Authentication Processing

Figure 8:
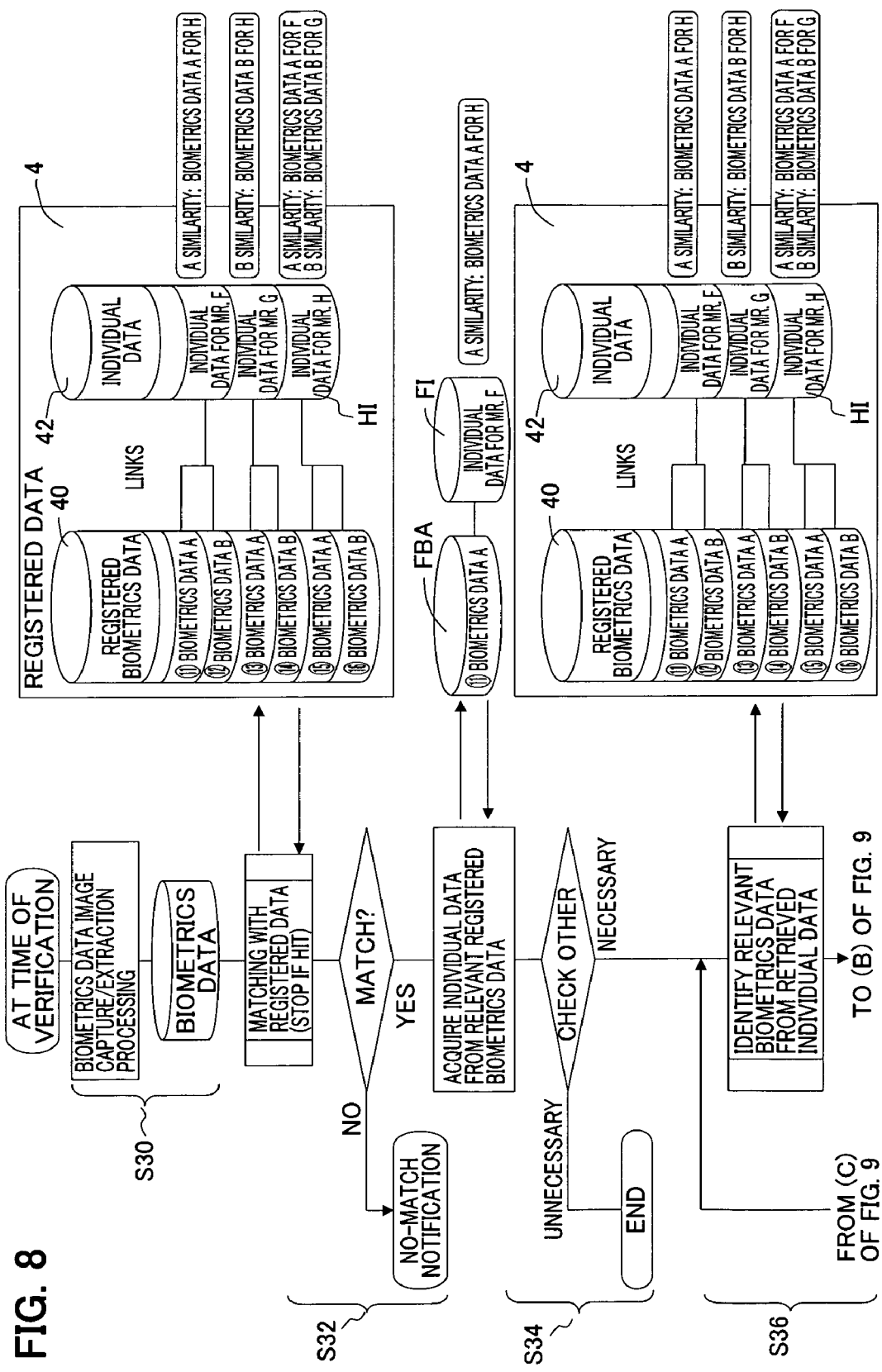
FIG. 8 is a first flow diagram of biometrics authentication processing in one embodiment of the invention.
Figure 9:
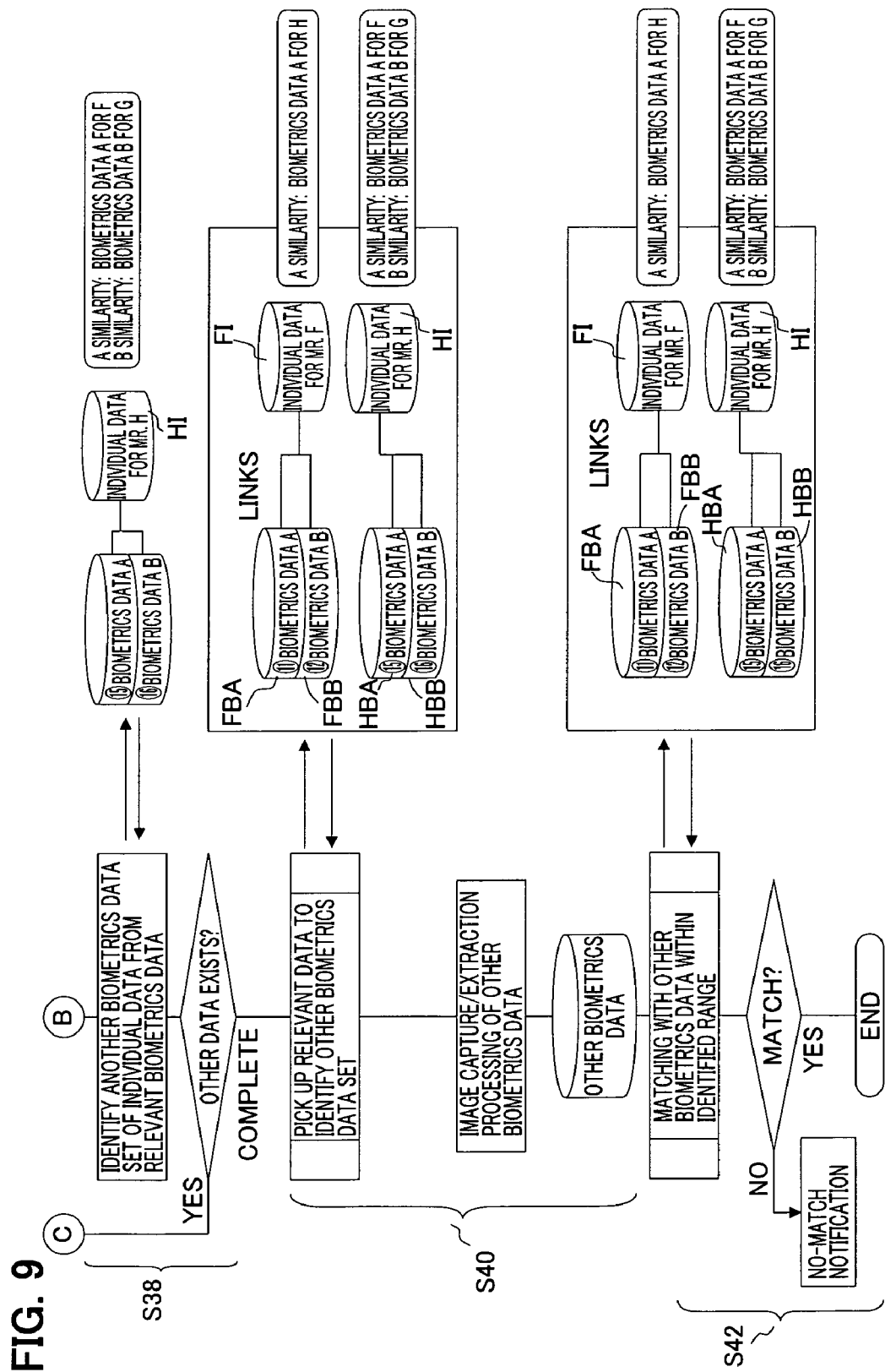
FIG. 9 is a second flow diagram of biometrics authentication processing in one embodiment of the invention.

Next, FIG. 8 and FIG. 9 are used to explain authentication processing using registered biometrics data, explained using FIG. 6 and FIG. 7. FIG. 8 and FIG. 9 show the flow of biometrics authentication processing.

(S30) The user places his right hand over the image capture device 1 of one of the facilities 20 to 26 (see FIG. 1), causing an image of the palm (blood vessel image) to be captured by the image capture device 1. The authentication library 34 of the image capture device 1 in FIG. 2 and FIG. 5 executes the image capture processing 34-1, 34-2, 34-5 explained using FIG. 5, and acquires biometrics characteristic data (characteristic data of the right-hand blood vessel image) A. By this means, biometrics data A (FBA) for the user (here, Mr. F) is obtained. The image capture device 1 transmits this biometrics data to the server 3.

(S32) The server 3 verifies the right-hand biometrics data A (FBA) (for Mr. F) against the registered right-hand biometrics data A in the biometrics data file 40 of the data file device 4, calculates the degree of similarity, and judges whether there exists a biometrics data set A with a degree of similarity greater than or equal to the threshold (whether there is a hit). If no such set exists (no match), the image capture device 1 is notified of the absence of a match, and is instructed to perform a retry (to again capture an image using the image capture device 1).

(S34) If on the other hand a biometrics data set A for which the degree of similarity is equal to or greater than the threshold (which matches) is registered, the link table 44 (see FIG. 2) is referenced, and the individual data (here, for Mr. F) of the registered biometrics data A is identified. Further, a judgment is made as to whether there are right-hand identification numbers, for persons other than this individual, judged to be similar in the similarity check information CF for the individual data FI identified in the individual data file 42. If there exist no right-hand similarity identification numbers in the similarity check information CF, then there is no need for a check of the other data (for the left hand), and so the matching individual is identified as the individual in question, and processing ends.

(S36) If on the other hand a right-hand similarity identification number is existed in the similarity check information CF, then a check of left-hand biometrics data is performed. That is, the server 3 identifies the identification number (here, biometrics data A for Mr. H) of the retrieved individual data similarity check information. When there is similar data for a plurality of persons, a plurality of similarity identification numbers are identified.

(S38) The identified identification number is used to reference the link table 44, to identify the other (left-hand) biometrics data B (HBB) of the individual data for the biometrics data A. Similarly, a judgment is made, using the similarity check information, as to whether there are other identification numbers. If there are other identification numbers, processing returns to step S36.

(S40) When similarity check information is used to identify all the left-hand biometrics data B to which the right-hand biometrics data is similar, the left-hand biometrics data B in question (here, for Mr. F and Mr. H) is retrieved from the biometrics data file 40 of the data file device 4. The user then holds his left hand over the image capture device 1 of the facility 20 to 26 (see FIG. 1), causing an image of the palm of the hand (blood vessel image) to be captured by the image capture device 1. The authentication library 34 of the image capture device 1 in FIG. 2 and FIG. 5 executes the image capture processing of 34-1, 34-2, 34-5 explained in FIG. 5, and acquires biometrics characteristic data (characteristic data of the left-hand blood vessel image) B. By this means, biometrics data B (FBB) for the user (here, Mr. F) is obtained. The image capture device 1 transmits this biometrics data B to the server 3.

(S42) The transmitted biometrics data B (FBB) is then verified against the biometrics data B over the identified range, retrieved in step S40 (Mr. F, Mr. H), and degrees of similarity are calculated. In the left-hand verification results, a judgment is made as to whether there exists a biometrics set B with a degree of similarity equal to or greater than the threshold (whether there is a match); if no such set exists, notification of the absence of a match is given, and a retry or similar is executed. If however a similar left-hand biometrics data set B with degree of similarity equal to or above the threshold is registered, then the individual of this biometrics data set B is authenticated as the individual in question.

In this way, in 1:n authentication, even when one type biometrics data set and one type registered biometrics data set have a degree of similarity which reaches a threshold, a judgment is made as to whether another similar one type biometrics data set has been registered. If another similar one type biometrics data set has been registered, the degree of similarity of another type biometric data corresponding to a plurality of similar one type biometrics data sets with another type data for which an image has been captured is calculated, and an individual for which the degree of similarity of both biometrics data sets is equal to or above the threshold is identified as the individual in question.

Hence when the one type biometrics data of another person is similar to the one type biometrics data of the individual in question, another type biometrics data of the individual in question is verified against another type biometrics data, and so accurate authentication of the individual in question can be performed, without modifying thresholds for the degree of similarity, and moreover circumstances in which the individual in question cannot be authenticated as the individual in question can be prevented.

Biometrics Data Deletion Processing

Figure 10:
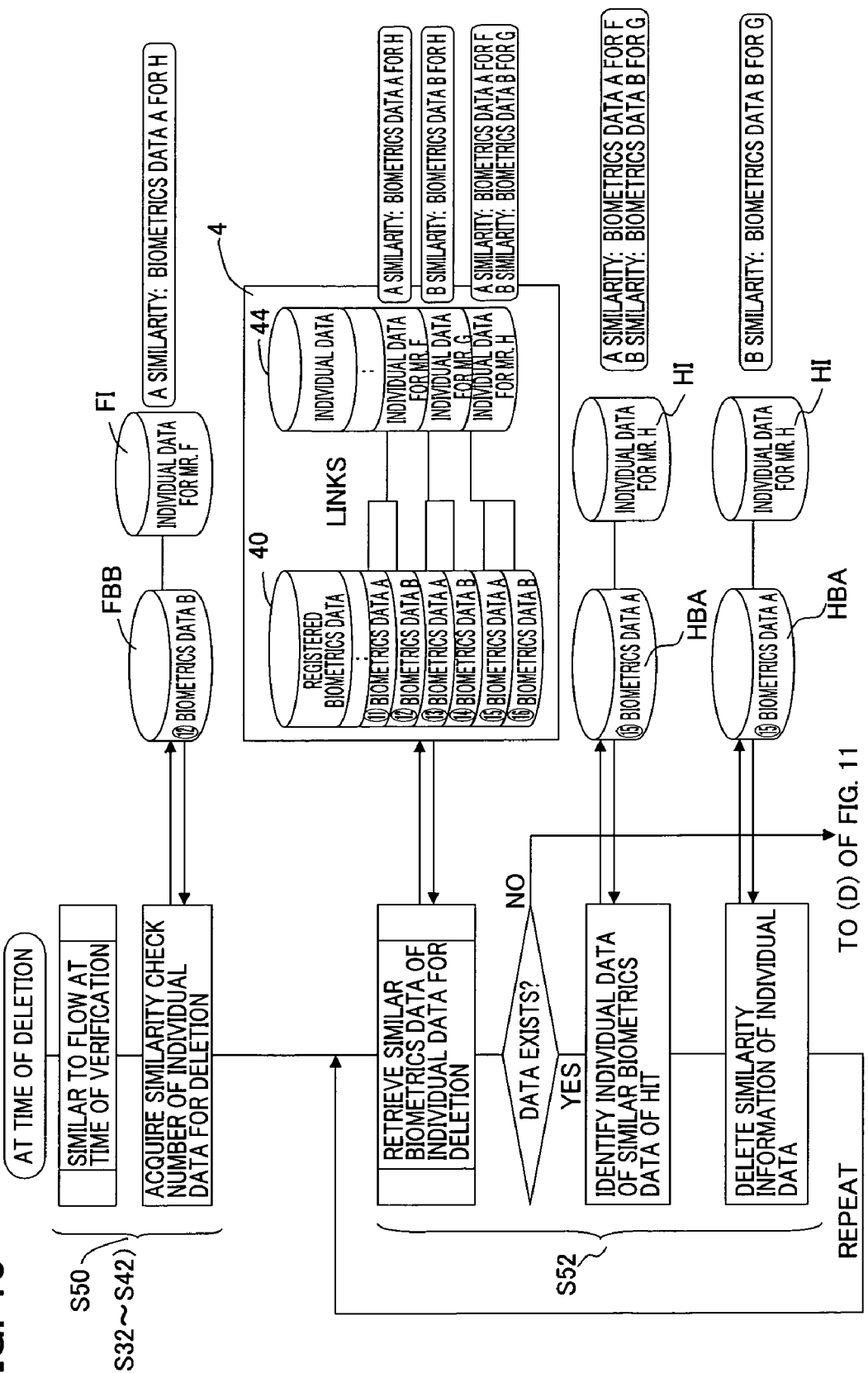
FIG. 10 is a first flow diagram of biometrics data deletion processing in one embodiment of the invention.

Next, FIG. 10 and FIG. 11 are used to explain processing to delete the registered biometrics data of FIG. 6 and FIG. 7.

(S50) At the front desk 27, the person to be deleted has an image of his palm captured, and the above-described verification processing steps S32 to S42 are executed to identify the person for deletion (here, Mr. F). From the similarity check information CF of the individual data FI for the person for deletion, identification numbers for similar biometrics data (here, biometrics data for Mr. H) is acquired.

(S52) Next, a search for biometrics data similar to that of the person for deletion is begun. First, a judgment is made as to whether relevant identification numbers exist in the above-described similarity check information CF. If there are no relevant identification numbers in the similarity check information CF, processing proceeds to step S54 in FIG. 11. On the other hand, if a relevant identification number exists in the similarity check information CF, the individual data HI for the biometrics data corresponding to the identification number (here, biometrics data A for Mr. H) is identified from the link table 44. Then, the identification number of the similarity check information CF of this individual data HI (the identification number for biometrics data A of Mr. F) is deleted. Processing then returns to the beginning of the step, and deletion processing is repeated for relevant identification numbers existing in the similarity check information CF.

(S54) When in this way the similarity check information of individual data for other persons having registered biometrics data similar to the biometrics data for the person for deletion is deleted, the biometrics data A, B of the biometrics data file 40, and the individual data in the individual database file 44, of the person for deletion (here, Mr. F) is deleted.

(S56) In order to confirm deletion, palm image capture is performed for the person for deletion, and the above-described verification processing steps S32 to S42 are executed. In this example, Mr. H, whose biometrics data is similar to the right-hand biometrics data A of the above-described Mr. F, is judged to be the individual in question; but although the terminal 28 at the front desk 27 is informed that the individual is Mr. H, the person for deletion is in fact Mr. F, and so the fact of deletion is confirmed.

In this way, even when information for use in similarity judgments is set in 1:n authentication, similarity judgment information is deleted together with the deletion of data for the person to be deleted, so that subsequent errors in similarity judgments can be prevented. Moreover, after deletion processing the biometrics data for the person for deletion is again acquired and is verified against biometrics data in the biometrics database file 40 to confirm the deletion, so that the person whose information is being deleted can himself confirm the deletion of the biometrics data. That is, the individual in question can confirm that individual information is protected.

Further, in the course of registration, verification, and deletion of biometrics data, there is no manipulation or acquisition of biometrics data by persons other than the individual in question, so that leakage and similar of biometrics data can be prevented. Moreover, the individual data manipulated by an operator is isolated from the biometrics data by a link table, so that the operator can be kept from accessing the biometrics data.

Other Embodiments

In the above embodiments, an explanation was given using, as pairs of biometrics data, blood vessel image data for the palms of the hands; but blood vessel image data for the backs of the hands or the fingers may also be used. Further, application is possible using not only the same kind of biometrics data, but combinations of different kinds of biometrics data. For example, application is also possible to a combination of the vein pattern of the palm of the hand and the vein pattern of the fingers, or to a combination of the vein pattern of the hand or fingers with fingerprints, palmprints, retina images, or facial features, or similar.

Further, in deletion processing, the verification processing prior to deletion may be omitted, and the individual in question may input an identification number for individual data; similarly, the verification processing after deletion can be omitted.

Further, the fields of application are not limited to use in hotels or other facilities, and the invention can be applied to systems for rental of videos, automobiles and similar, uses in place of credit cards in finance and distribution areas, reservation checking systems for train, aircraft and other means of transportation, as well as building entry/exit management systems for which secrecy is required, and similar.

In the above, embodiments of the invention have been explained; but various modifications can be made within the scope of the invention, and these modifications are not excluded from the scope of the invention.

When one type biometrics data set for another person is similar to one type biometrics data set for the individual in question, another type biometrics data for the individual in question is verified against another type biometrics data for the other person, so that the individual in question can be authenticated accurately without modifying the threshold for the degree of similarity, and moreover the occurrence of cases in which the individual in question cannot be authenticated as the individual in question can be prevented, and the ratio of acceptance of other persons in 1:n authentication can be lowered.

What is claimed is:

1. A biometrics authentication system which detects characteristics of a body of a user to perform individual authentication, comprising:
    a detection device which detects a target portion of the body and outputs biometrics data indicating characteristics of the body;
    a database file which stores a set of at least two type biometrics data for each of a plurality of users, detected by the detection device and similarity information indicating existence of a similar biometric data of another user; and
    a control unit, at the time of authentication, first verifies one type biometrics data detected by the detection device against one type biometrics data of said two type biometric data registered in the database file, judges that similar registered one type biometrics data of another user exists in the database file by referring said similarity information when said first verify is successful, second verifies another type biometrics data of said user detected by the detection device against another type biometrics data of said user and said another user which has a similarity relationship in the database file, and identifies an individual with biometrics characteristic data for which the second verification result is satisfactory.

2. The biometrics authentication system according to claim 1,
    wherein the control unit, at the time of registration of the biometrics data, performs verification of at least one type biometrics data of an user detected by the detection device against the one type biometrics data of another user registered in the database file, judges whether a similar one type biometrics data of another user is registered, and, if the similar one type biometrics data is registered, registers in the database file said similarity information indicating the existence of similar data together with the two type biometrics data.

3. The biometrics authentication system of claim 1, wherein the control unit, upon judging that there exists one type registered biometrics data similar to the one type detected biometrics data, identifies, from the similarity information which has been set for the one type biometric data judged to be similar, another type biometric data forming a pair with the other similar one type biometric data, verify another type detected biometrics dataagainst the identified another type biometric data and another type biometric data forming a pair with the one similar one type biometric data registered in the database file, and perform individual authentication.

4. The biometrics authentication system of claim 1, wherein the control unit sets, as the similarity information, an identifier of the other similar biometrics data in the one similar biometrics data, and an identifier of the one similar biometrics data in the other similar biometrics data.

5. The biometrics authentication system according to claim 4, wherein the control unit, upon judging that one type registered biometrics data similar to the one type detected biometrics data exists, identifies another type biometrics data forming a pair with the other similar one type biometrics data from the other one type biometrics data identifier which has been set in the registered one type biometrics data which is judged similar, verifies the detected another type biometrics data against the registered another type biometrics data forming a pair with the other similar one type biometrics data and the registered another type biometrics data forming a pair with the judged one type biometrics data, and performs individual authentication.

6. The biometrics authentication system according to claim 1, wherein the database file comprises:
    a biometrics database file which stores biometrics data;
    an individual database file which stores individual data for the user; and
    a link table which links the individual data in the individual database file to the biometrics data in the biometrics data file.

7. The biometrics authentication system according to claim 6, wherein the individual data file stores similarity information indicating the fact that there is registered biometrics data for another person similar to the biometrics data for the user of the individual data.

8. The biometrics authentication system according to claim 1, wherein the control unit acquires biometrics data for the user from the detection device, verifies the detected biometrics data against the biometrics data registered in the database file, and deletes the biometrics data for the user from the database file.

9. The biometrics authentication system according to claim 8, wherein the control unit sets, as similarity information, an identifier of other similar biometrics data in the one similar biometrics data, and an identifier of the one similar biometrics data in the other similar biometrics data, and deletes the biometrics data for the user and the both identifiers from the database file.

10. The biometrics authentication system according to claim 1, wherein the detection device comprises a device which detects a blood vessel image of the body.

11. The biometrics authentication system according to claim 10, wherein the detection device comprises an image capture unit which captures a blood vessel image of a hand of the body.

12. A biometrics authentication method of detecting characteristics of a body of a user and performing individual authentication, comprising:
    a step of detecting a target portion of the body and of outputting biometrics data indicating characteristics of the body by a detection unit;
    a step of first verifying detected one type biometrics data against one type biometrics data of at least two type biometrics data of same user registered in a database file by a control unit:
    a step of judging whether there exists the registered one type biometrics data of another user which is similar by referring a similarity information which indicates existence of a similar biometric data of another user and registered in the database file, when said verify is successful, by said control unit; and
    a step of, when the similar one type biometrics data is judged to be registered, second verifying another type biometrics data of said user detected by the detection device against another type biometrics data of said user and said another user which has a similarity relationship in the database file, and identifying an individual with biometrics characteristic data for which the second verification result is satisfactory, by said control unit.

13. The biometrics authentication method according to claim 12, wherein further comprises:

a step of performing verification of at least one type biometrics data detected by the detection device against the one type biometrics data of another user registered in the database file by said database control unit;

a step of judging whether a similar one type biometrics data of another user is registered; and a step of, when similar one type biometrics data of another user is registered, registering, in the database file, at least two different type biometrics data for each of a plurality of users, detected by the detection device and similarity information indicating the existence of similar data together with the two different one type biometrics data.

14. The biometrics authentication method of claim 12, wherein the judgment step comprises a step of identifying another type biometric data forming a pair with the other similar one type biometric data from the similarity information which has been set for the one type biometric data judged to be similar, and said second verification step comprises a step of verifying another type detected biometrics set against the identified another type biometric data and another type biometric data forming a pair with the one similar one type biometric data registered in the database file, and performing individual authentication.

15. The biometrics authentication method of claim 13, wherein the registration step comprises a step of setting, as the similarity information, an identifier of the other similar biometrics data in the one similar biometrics data, and an identifier of the one similar biometrics data in the other similar biometrics data.

16. The biometrics authentication method according to claim 15, wherein the authentication step comprises:

a step of identifying another type biometrics data forming a pair with the other similar one type biometrics data from the identifier of the other similar biometrics data, which has been set for the one type biometrics data which is judged similar; and a step of verifying the detected another type biometrics data against the identified another type biometrics data with the another type biometrics data forming a pair with the one type biometrics data in the database file, and performing individual authentication.

17. The biometrics authentication method according to claim 12, wherein the registration step comprises:

a step of storing the biometrics data in a biometrics database file;

a step of storing individual data for the user in an individual database file; and a step of creating a link table to link the individual data in the individual database file with the biometrics data in the biometrics database file.

18. The biometrics authentication method according to claim 17, further comprising a step of storing, in the individual data of the individual data file, similarity information indicating the fact that the registered biometrics data for another person is similar to the biometrics data of for user of the individual data.

19. The biometrics authentication method according to claim 12, wherein further comprising:

a step of acquiring biometrics data for the user from the detection device, verifying the acquired biometric data against the biometrics data registered in the database file, and deleting the biometrics data for the user from the database file.

20. The biometrics authentication method according to claim 19, wherein the deletion step further comprises a step of deleting, from the database file, the similarity information in which an identifier of the other similar biometrics data is set in the one similar biometrics data, and an identifier of the one similar biometrics data is set in the other similar biometrics data.

21. The biometrics authentication method according to claim 12, wherein the detecting step comprises a step of detecting a blood vessel image of the body and outputting biometrics data indicating characteristics of the blood vessel image.

22. The biometrics authentication method according to claim 21, wherein the detecting step comprises a step of capturing an image of blood vessels of a hand of the body, and outputting biometrics data indicating characteristics of the blood vessel image.

* * * * *